US011193656B2

(12) United States Patent
Lovinger et al.

(10) Patent No.: US 11,193,656 B2
(45) Date of Patent: Dec. 7, 2021

(54) HYPERCUBE DISPLAY DEVICE

(71) Applicant: The Hyperspace Lighting Company Limited Liability Company, San Diego, CA (US)

(72) Inventors: Dylan Joshua Lovinger, San Diego, CA (US); Timothy Francis O'Connor, III, San Diego, CA (US)

(73) Assignee: The Hyperspace Lighting Company, San Diego, CA (US)

( * ) Notice: Subject to any disclaimer, the term of this patent is extended or adjusted under 35 U.S.C. 154(b) by 0 days.

(21) Appl. No.: 17/039,634

(22) Filed: Sep. 30, 2020

(65) Prior Publication Data

US 2021/0095838 A1     Apr. 1, 2021

Related U.S. Application Data

(60) Provisional application No. 62/909,105, filed on Oct. 1, 2019.

(51) Int. Cl.
*F21V 21/00* (2006.01)
*F21V 23/00* (2015.01)
(Continued)

(52) U.S. Cl.
CPC ............... *F21V 21/00* (2013.01); *F21V 7/05* (2013.01); *F21V 23/002* (2013.01);
(Continued)

(58) Field of Classification Search
CPC ... F21V 21/00; F21V 7/05; F21V 7/22; F21V 23/002; F21V 23/003; G02B 27/141;
(Continued)

(56) References Cited

U.S. PATENT DOCUMENTS 3,610,918 A    10/1971 Barlow
3,790,772 A     2/1974 Newman
(Continued)

FOREIGN PATENT DOCUMENTS

GB      2210490      6/1989

OTHER PUBLICATIONS

Dylan Lovinger, Screen captures from video posted to Facebook on Aug. 20, 2018 and edit history of text posted to Facebook with the video dated Aug. 20, 2018; Aug. 22, 2018; Sep. 11, 2018; Sep. 26, 2018; and Sep. 27, 2018, https://m.facebook.com/lovinger/videos/10160650382635696/UzpfSTc2NjU2MDY5NToxMDE2MDY1MDQxMTg3MDY5Ng/.

*Primary Examiner* — Alan B Cariaso

(57) ABSTRACT

An illumination appliance includes an illumination device, a controller, and a wiring system. The illumination device includes a plurality of interconnected hollow struts, a plurality of semi-reflective sheets, and a plurality of banks of light emitting devices (LEDs). The plurality of interconnected hollow struts collectively define a polygonal body such as a cube with openings. The plurality of interconnected hollow struts individually have an inward facing surface. The plurality of semi-reflective sheets close the openings to define an enclosure within the polygonal body. The plurality of banks of LEDs are mounted on the inward facing surfaces. Some of the light emitted by the LEDs is internally reflected and some is transmitted by the semi-reflective sheets. The controller is for controlling operation (Continued)

of the banks of LEDs. The wiring system electrically couples the controller to the LEDs and routes through the hollow struts to individually connect to the banks of LEDs.

19 Claims, 3 Drawing Sheets

(51) Int. Cl.
    *F21V 7/05*         (2006.01)
    *G02B 27/14*      (2006.01)
    *F21Y 107/50*     (2016.01)
    *F21Y 115/10*     (2016.01)
    *F21V 7/22*        (2018.01)

(52) U.S. Cl.
    CPC .......... *F21V 23/003* (2013.01); *G02B 27/144* (2013.01); *F21V 7/22* (2013.01); *F21Y 2107/50* (2016.08); *F21Y 2115/10* (2016.08)

(58) Field of Classification Search
    CPC .. G02B 27/144; F21S 4/20; F21S 4/28; F21Y 2107/40; F21Y 2107/50
    See application file for complete search history.

(56) References Cited

U.S. PATENT DOCUMENTS

| | | |
|---|---|---|
| 3,811,041 A | 5/1974 | Matsushita |
| 4,761,004 A | 8/1988 | Hargabus |
| 5,297,012 A * | 3/1994 | Fletcher .................. B60Q 7/00 362/235 |
| 5,810,465 A | 9/1998 | Hargabus |
| 6,709,339 B1 | 3/2004 | Hargabus |
| 6,929,552 B1 | 8/2005 | Hargabus |
| 6,976,768 B2 * | 12/2005 | Hewson .................. F21V 7/05 362/227 |
| D619,296 S | 7/2010 | Thevenot |
| 2004/0156214 A1 * | 8/2004 | Tseng ........................ F21V 7/00 362/565 |
| 2013/0027927 A1 * | 1/2013 | Wegger ..................... F21S 8/06 362/235 |
| 2015/0009665 A1 | 1/2015 | Durkee |
| 2015/0167940 A1 * | 6/2015 | Ng ........................ G02B 6/0051 362/270 |
| 2015/0300627 A1 * | 10/2015 | Wang ........................ F21S 9/02 108/23 |
| 2016/0116118 A1 * | 4/2016 | Bernard .................... F21K 9/27 362/224 |

\* cited by examiner

HYPERCUBE DISPLAY DEVICE

CROSS-REFERENCE TO RELATED APPLICATIONS

This non-provisional patent application claims priority to U.S. Provisional Application Ser. No. 62/909,105, Entitled "HYPERCUBE DISPLAY DEVICE" by Dylan Joshua Lovinger and Timothy Francis O'Connor, III, filed on Oct. 1, 2019, incorporated herein by reference under the benefit of 35 U.S.C. § 119(e).

FIELD OF THE INVENTION

The present disclosure concerns illumination appliances for purposes of aesthetic illumination, entertainment, and health and well-being.

BACKGROUND

Illumination appliances for purposes of aesthetic illumination, entertainment, and health and well-being include a number of prior art devices such as banks of lights and various lamp designs. While all of these have their purposes, there is a desire to provide a device that is portable and rugged while having a capacity to provide variable optical illusions, dynamic sound-to-light modulation, light therapy, interactivity, updatability, synchronization, and the ability to construct large scale lighting installations using each individual modules connected via wireless networking technology.

SUMMARY

Figure 1:
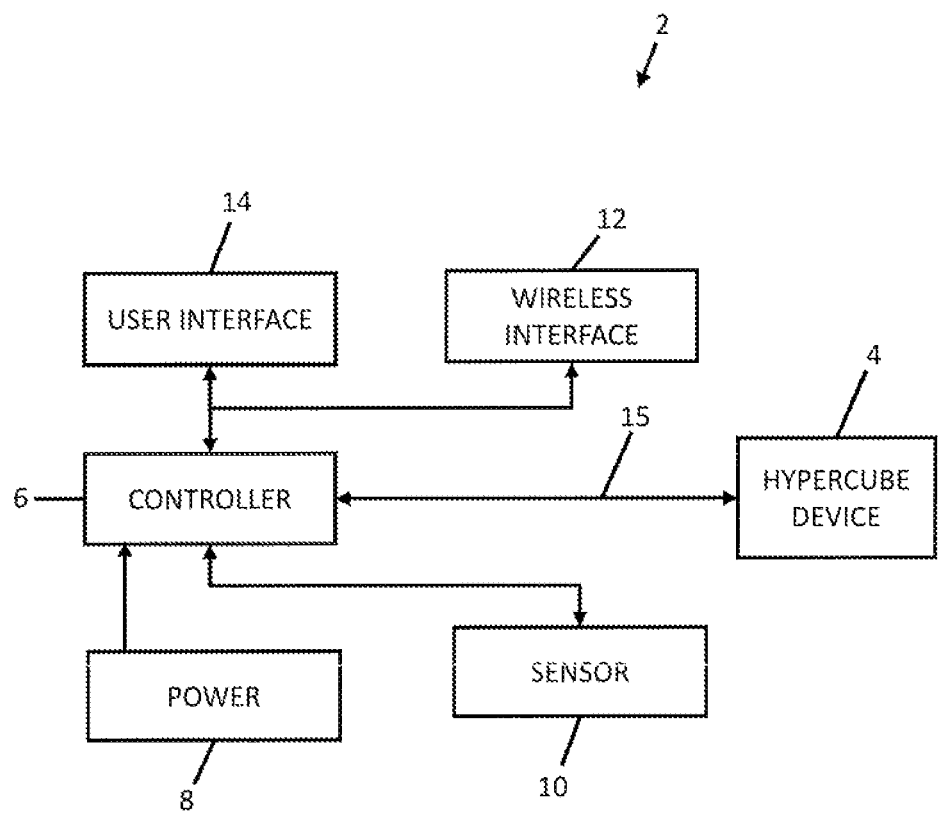
FIG. 1 is an electrical block diagram of an embodiment of a hypercube appliance.

In an aspect of the disclosure, an illumination appliance includes an illumination device, a controller, and a wiring system. The illumination device includes a plurality of interconnected hollow struts, a plurality of semi-reflective sheets, and a plurality of banks of light emitting devices (LEDs). The LEDs can be digitally addressable. The plurality of interconnected hollow struts collectively define a polygonal body with openings. The plurality of interconnected hollow struts individually have a major axis and an inward facing surface. The plurality of semi-reflective sheets individually close one of the openings to define an enclosure within the polygonal body. The plurality of banks of LEDs are individually mounted on one of the inward facing surfaces and with the LEDs arranged along the major axis. At least some of the light emitted by the LEDs is internally reflected by the semi-reflective sheets within the enclosure and some of the light is transmitted out of the enclosure. The controller is for controlling operation of the LEDs. The wiring system electrically couples the controller to the LEDs and routes through the hollow struts to individually connect to the banks of LEDs.

This design is advantageous for a number of reasons. The interconnected hollow struts provide multiple functions including structural support, defining the polygonal shape, providing mounting surfaces, and routing the wiring system. The hollow struts provide the inward facing surfaces for providing an effective geometric mount of the optical axes of the LEDs. An optical axis of an LED is defined as an axis that is centered upon the LED and normal to a surface upon which the LED is formed. The hollow struts also provide internal routing of the wiring system so that the wiring system does not interfere with mounting of the banks of LEDs or impact an optical path of light emitted by the LEDs. The hollow struts also provide a surface for mounting the semi-reflective sheets.

In one implementation the illumination device is a hypercube. The polygonal body is thus a cube with six faces. Five of the faces can define openings that are closed with the semi-reflective sheets and includes four lateral faces and one top or upper face. A sixth lower face would rest upon a generally horizontal surface during use of the illumination appliance. In some embodiments the controller can be located adjacent the lower face. The plurality of interconnected hollow struts can include twelve interconnected hollow struts. The hypercube can include eight corner connectors that individually couple together three of the twelve interconnected hollow struts. In some embodiments, all six faces that define openings are close by the semi-reflective sheets.

In another implementation the plurality of interconnected hollow struts are individually constructed from an outer frame and an inner frame. The inner frame can support two banks of the LEDs. The inner frame can define two of the inward facing surfaces that are generally at right angles to one another and that support two banks of the LEDs. An optical axis of an LED on one of the two banks is at right angles to an optical axis of an LED on another of the two banks.

In yet another implementation, the sheets have a transmissivity within a range of 10 percent (10%) to 40 percent (40%). More particularly, the sheets can have a transmissivity within a range of 20 percent (20%) to 30 percent (30%). These ranges of transmissivity have been found to provide the best results with LEDs mounted within the enclosure.

In a further implementation, the semi-reflective property of the sheets is provided by a coating which is one or more of an aluminum coating, a chromium coating, and a dichroic coating. The semi-reflective coating can be on an outside surface of the semi-reflective sheets. When the semi-reflective coating is on the outside surface, it can be further protected and covered by an anti-abrasion coating. The anti-abrasion coating can include inorganic particles bound within an organic binder. The inorganic particles can include one or more of silicon dioxide, alumina, aluminum oxide, zirconia, and zirconium oxide. The organic binder can be an ultraviolet or photon curable binder such as an acrylate binder having a light sensitive catalyst. The sheets can have a base material such as glass, plastic, or acrylic. An outer surface of the base material corresponds geometrically to an outer surface of the semi-reflective sheet. Upon the outer surface of the base material is the semi-reflective coating. Upon the semi-reflective coating is the protective outer anti-abrasion coating. This layer architecture has advantages, because a single anti-abrasion coating protects the semi-reflective coating and also provides scratch resistance to the outer surface of the semi-reflective sheet.

The above aspect and implementations concern a physical configuration of the illumination device. This physical configuration includes physical orientations of strut surfaces and placement and orientation of LEDs upon the strut surfaces.

The physical configuration also includes transmissive and reflective properties of the semi-reflective sheets. One result of this configuration is multiple internal reflections and external transmissions that provide an illusion that an internal volume of the device is greater than an external volume of the device. Another result of this configuration is an illusion of an infinite internal array of crossed columns and beams.

In a yet further implementation the controller is coupled to and responsive to one or more inputs including one or more of a user interface, a wireless interface, a sensor, and an internal clock. The sensor can include one or more sensors that are responsive to one or more of music, pressure, sound, radiation, and other physical inputs. In response to the one or more inputs, the controller can execute an operating mode from among a plurality of operating modes. The execution of the operating modes employs software that has been designed to utilize the aforementioned illusion of an infinite array as well as the spatial symmetries of the polyhedron's vertices. The operating modes can differ from one another based upon one or more of LED color, LED intensity, LED duty cycle, a spatial pattern of LED illumination, spatial symmetries of LED illumination, and a temporal variation of LED illumination.

DETAILED DESCRIPTION OF THE PREFERRED EMBODIMENTS

FIG. 1 is an electrical block diagram of an embodiment of a hypercube appliance 2. Hypercube appliance 2 includes a hypercube device 4 that is electrically coupled to a controller 6. In the illustrated embodiment, the controller 6 is also coupled to a power source 8, a sensor 10, a wireless interface 12, and a user interface 14.

The hypercube device 4 will be described in more detail infra. The hypercube device 4 includes a framework that supports banks of LEDs (light emitting devices or diodes), power delivery circuitry or wiring system 15, and semi reflective panels. Through the power delivery circuitry, the controller 6 is controllably coupled to the LEDs.

In an illustrative embodiment, sensor 10 is a microphone or acoustic sensor 10. The sensor 10 generates a signal in response to received sound sources such as music, voices, or other sound sources. The controller 6 receives the signal and is configured to optionally activate and control the LEDs in response. The responsive activation can, for example, include LED-outputted colors and patterns in response to the signal in real time.

The wireless interface 12 allows the controller 6 to communicate with a host computing device such as a smart phone, a tablet computer, or a laptop computer to name a few and not intending to be limiting. The host computer can, through the wireless interface 12, alter operation of the controller 6 to, for example, control activation and sequencing of the LEDs, control the LED colors and patterns, and control the mode of operation, e.g., nightlight mode, sound responsive mode, or other modes. The user interface 14 can include features such as an ON/OFF switch and other controls by which a user can alter operation of the controller 6. In some embodiments, the user interface 14 can include a physically separate user device such as a desktop computer, a laptop computer, a tablet computer, a smartphone, or other client device 14. The controller 6 can then function as a server for the client device 14.

The controller 6 includes an information storage device coupled to a processor. The information storage device includes a non-volatile or non-transient information storage device storing software instructions. The processor executes the software instructions to provide operations of the controller 6 including the execution of operating modes and response to inputs such as from the sensor 10, the user interface 14, the wireless interface 12, or from an internal clock that forms part of the controller 6. The next four illustrative embodiments are examples of configurations for the hypercube appliance 2 with controller 6.

In a first illustrative embodiment, the sensor 10 is an acoustic sensor or microphone 10. The controller 6 is configured to analyze sound signals from sensor 10 including analyzing wave amplitudes and carrier frequencies and to modulate operating modes in response. The carrier frequencies can be divided up or separated into frequency bands. The modulation of the operating modes can include output parameters such as LED color, LED intensity, rate of LED pulsing, and other human perceptible parameters. A variation or threshold in amplitude of the sound may induce a change in operating mode. The operating parameters may functionally map into certain frequency bands.

Modulation of the operating modes can provide health and wellness functions. In particular, the LED operation in response to music and sounds can provide a "light therapy" or "guided meditation" function.

A second illustrative embodiment includes a plurality of hypercube appliances 2 that operate in a coordinated way. The plurality of hypercube appliances 2 can include a master hypercube appliance 2 that transmits control signals to a plurality of subsidiary hypercube appliances 2. The control signals can be directly transmitted using wireless interfaces 12 or indirectly through network hardware such as routers and servers. Coordinated operation can include the same or complementary sequencing and colors of the LEDs. Coordinated operation can also include higher level patterns formed by plural hypercube appliances 2. A coordinated operating mode can include a device-specific operating mode (color, frequency, intensity, etc.) and an inter-device operating mode that creates an illusion or pattern that is coordinated across an arrangement of hypercube appliances 2.

A third illustrative embodiment includes a plurality of hypercube appliances 2 and other devices that are linked through a network such as the Internet and can include aspects of the first and second illustrative embodiments. As such, a hypercube appliance 2 functions as an interactive Internet of Things (IoT) device. The linked devices including the hypercube appliances 2 may be adjacent and/or remotely located with respect to each other.

Figure 2:
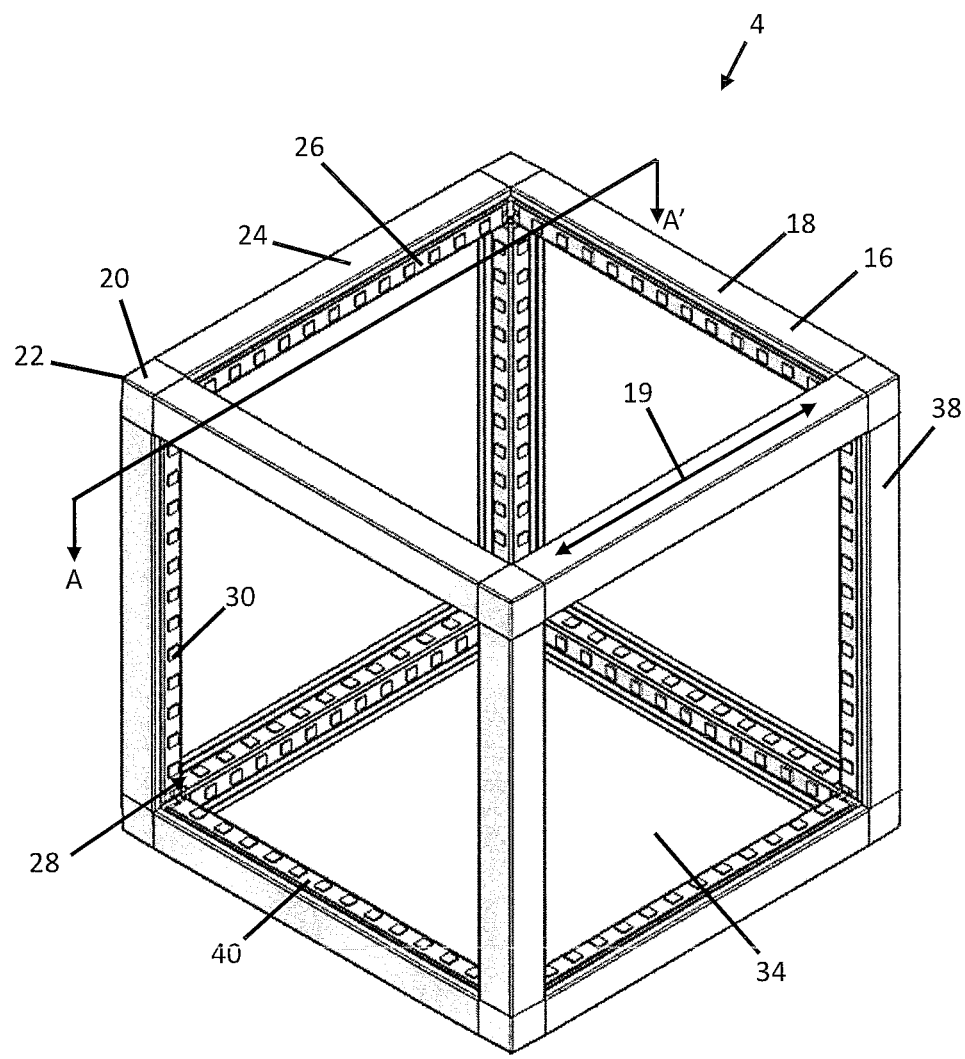
FIG. 2 is an isometric view of an embodiment of a hypercube device.

FIG. 2 is an isometric drawing illustrating an embodiment of the hypercube device 4. In what follows, mutually orthogonal axes X, Y, and Z will be used. Axes X and Y are lateral axes that are generally horizontal when the hypercube device 4 is resting upon a horizontal surface. Axis Z is generally vertical when the hypercube device 4 is resting upon a horizontal surface. By "generally" it is meant to be by engineering design and accurate to within manufacturing tolerances. Although FIG. 2 orients the hypercube device 4 as if resting upon a horizontal surface, the hypercube device 4 alternatively could be mounted or hung in a different orientation.

Hypercube device 4 includes a cube-shaped framework 16. For example and not intending to be limiting, the framework 16 may be constructed from twelve hollow struts 18 and eight corner connectors 20. The corner connectors 20 collectively define eight corners 22 of the cube-shaped framework 16. The struts 18 have a major axis 19 between pairs of corner connectors 20. The struts individually define outward-facing rectangular surfaces 24 and inward-facing rectangular surfaces 26.

The inward-facing rectangular surfaces 26 individually have elongate banks 28 of LEDs 30. The elongate banks 28 of LEDs 30 extend along the major axes 19 of the struts 18. The struts 18 individually have two banks 28 of LEDs 30 disposed upon inward-facing perpendicular surfaces 26. Since there are twelve struts 18, there are twenty-four banks 28 of LEDs 30. There are therefore eight banks 28 of LEDs 30 that extend along each of the axes X, Y, and Z.

Other designs are possible. While the illustrated embodiment has two banks of LEDs 30 per strut 18, a design with a single bank of LEDs 30 per strut 18 is possible. Also, the struts 18 may individually define an oblique surface (e.g., defining an angle of 45 degrees with respect two of the axes) that mounts a bank 28 of LEDs 30.

Figure 2A:
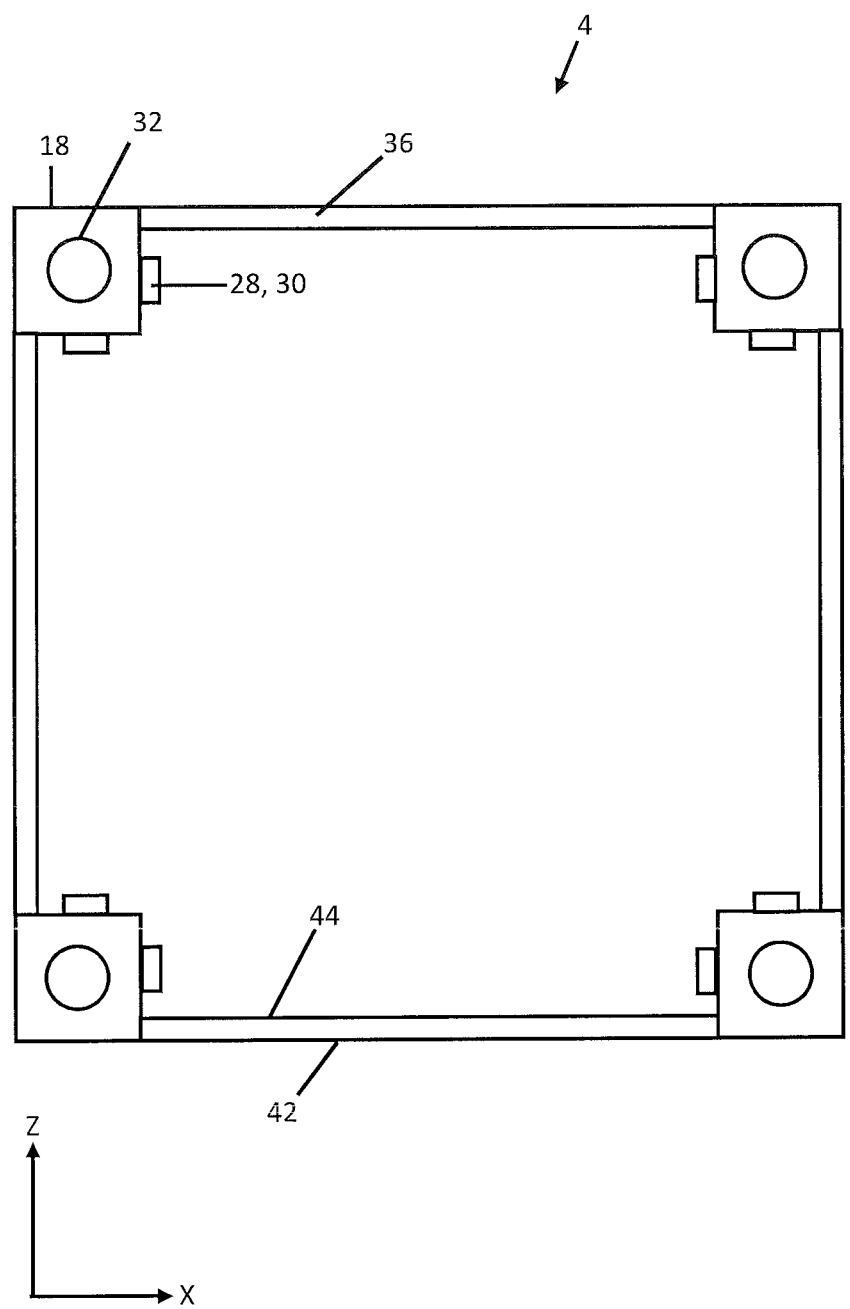
FIG. 2A is a simplified cross sectional schematic view through AA' OF FIG. 2.

FIG. 2A is a simplified cross-sectional schematic view taken through AA' of FIG. 2. The struts 18 are hollow and carry a wiring harness 32 that is part of the power delivery circuitry 15 (FIG. 1). The wiring harness is electrically coupled to the controller 6 and is coupled to the banks 28 of LEDs 30.

The framework 16 defines six square openings 34 (FIG. 2). A plurality of semi-reflective sheets 36 close the openings 34. The struts 18 therefore provide multiple functions including (1) providing the structural framework for the hypercube device 4, (2) routing the wiring harness 32, (3) supporting the LED banks 28, and (4) supporting the semi-reflective sheets 36.

The cross-sectional view of FIG. 2A has been simplified to illustrate a basic structure and function of the hypercube 4. In the illustrative embodiment of FIG. 2, the framework 16 includes an outer frame 38 and an inner frame 40 that assemble together to define the framework 16. Thus, the struts 18 individually are constructed from outer and inner portions corresponding to the outer frame 38 and the inner frame 40. The framework 16 can be formed from any of a variety of materials that include one or more of polymers, metals, ceramics, and composite materials. In one embodiment, the framework 16 can be formed from polyvinyl chloride (PVC) frames. In another embodiment, the framework 16 can be formed from anodized aluminum.

The semi-reflective property of the sheets 36 results in multiple reflections from the LED banks 28 that can be observed from outside of the hypercube 4. This creates an illusion of an infinite array of crossed columns and beams that support LEDs and the image of more space inside of the hypercube 4 than is contained by its volume. To provide the semi-reflective property, the sheets can be coated with a thin reflective material. Suitable materials are those known in the art and, while not intending to be limited, an example is aluminum.

In a particular embodiment, the sheets 36 are about 3.5 millimeters thick and formed from acrylic. The sheets 36 have opposing outside 42 and inside 44 surfaces. The acrylic has at least two coatings on the outside surface 42. To provide the semi reflective property, the outside surface of acrylic is coated with aluminum to provide a transitivity of about 25% plus or minus 5%. Thus about 25% of the light received from an LED is transmitted while about 75% is reflected. To protect the aluminum and acrylic from abrasion, an outer anti-abrasion coating is provided over the aluminum layer.

Variations in sheets 36 are possible. The thickness can vary. The transmissivity can range from about 10% to 40% or more particularly from about 15% to 30%. Other partially reflective materials can also be used such as chromium, dichroic materials, or other partially reflective materials.

Anti-abrasion coatings can contain extremely fine or nanoparticle sized inorganic particles in an organic binder. The inorganic particles can be formed from one or more of silica or silicon oxide, alumina or aluminum oxide, zirconia or zirconium oxide, and other suitable materials. The organic binder can be an ultraviolet and/or heat cured polymeric vehicle.

Other anti-abrasion coatings can be inorganic coatings that are deposited onto the aluminum. Suitable depositing processes are those known in the art and, while not intending to be limited, examples include one or more of thin film vapor deposition, sputtering, and plasma-enhanced vapor deposition.

The specific embodiments and applications thereof described above are for illustrative purposes only and do not preclude modifications and variations.

What is claimed:

1. An illumination appliance comprising:
    an illumination device including:
        a plurality of interconnected hollow struts that collectively define a polygonal body with openings, the plurality of interconnected hollow struts individually have a major axis and an inward facing surface;
        a plurality of semi-reflective sheets that individually close one of the openings to define an enclosure within the polygonal body;
        a plurality of banks of light emitting devices (LEDs) individually mounted on one of the inwards facing surfaces with the LEDs arranged along the major axis, at least some of the light emitted by the LEDs is internally reflected by the semi-reflective sheets within the enclosure and some of the light is transmitted out of the enclosure;
    a controller for controlling operation of the banks of LEDs; and
    a wiring system that electrically couples the controller to the LEDs, the wiring system routes through the hollow struts to individually connect to the banks of LEDs, wherein the controller is responsive to at least one input including one or more of a user interface, a wireless interface, a sensor, and an internal clock.

2. An illumination appliance comprising:
    an illumination device including:
        a plurality of interconnected hollow struts that collectively define a polygonal body with openings, the plurality of interconnected hollow struts individually have a major axis and an inward facing surface;
        a plurality of semi-reflective sheets that individually close one of the openings to define an enclosure within the polygonal body;
        a plurality of banks of light emitting devices (LEDs) individually mounted on one of the inward facing surfaces with the LEDs arranged along the major axis, at least some of the light emitted by the LEDs is internally reflected by the semi-reflective sheets within the enclosure and some of the light is transmitted out of the enclosure;
    a controller for controlling operation of the banks of LEDs; and
    a wiring system that electrically couples the controller to the LEDs, the wiring system routes through the hollow struts to individually connect to the banks of LEDs, wherein the polygonal body is a cube.

3. The illumination appliance of claim 2 wherein at least five of the openings are closed by the semi-reflective sheets.

4. An illumination appliance comprising:
an illumination device including:
a plurality of interconnected hollow struts that collectively define a polygonal body with openings, the plurality of interconnected hollow struts individually have a major axis and an inward facing surface;
a plurality of semi-reflective sheets that individually close one of the openings to define an enclosure within the polygonal body;
a plurality of banks of light emitting devices (LEDs) individually mounted on one of the inward facing surfaces with the LEDs arranged along the major axis, at least some of the light emitted by the LEDs is internally reflected by the semi-reflective sheets within the enclosure and some of the light is transmitted out of the enclosure;
a controller for controlling operation of the banks of LEDs; and
a wiring system that electrically couples the controller to the LEDs, the wiring system routes through the hollow struts to individually connect to the banks of LEDs, wherein the plurality of interconnected hollow struts includes 12 interconnected hollow struts and further including 8 corner connectors that individually couple together three ends of the 12 interconnected hollow struts.

5. The illumination appliance of claim 1 wherein the plurality of interconnected hollow struts are individually constructed from an outer frame and an inner frame, the inner frame defines the inward facing surface.

6. An illumination appliance comprising:
an illumination device including:
a plurality of interconnected hollow struts that collectively define a polygonal body with openings, the plurality of interconnected hollow struts individually have a major axis and an inward facing surface;
a plurality of semi-reflective sheets that individually close one of the openings to define an enclosure within the polygonal body;
a plurality of banks of light emitting devices (LEDs) individually mounted on one of the inward facing surfaces with the LEDs arranged along the major axis, at least some of the light emitted by the LEDs is internally reflected by the semi-reflective sheets within the enclosure and some of the light is transmitted out of the enclosure;
a controller for controlling operation of the banks of LEDs; and
a wiring system that electrically couples the controller to the LEDs, the wiring system routes through the hollow struts to individually connect to the banks of LEDs, wherein the inward facing surface includes two inward facing surfaces that are disposed at right angles with respect to each other and that support two corresponding banks of light emitting devices.

7. The illumination appliance of claim 1 wherein the sheets have a transmissivity of 10 to 40% for the light emitted by the LEDs.

8. The illumination appliance of claim 1 wherein the sheets have a transmissivity of 20 to 30% for the light emitted by the LEDs.

9. The illumination appliance of claim 1 wherein a semi-reflective property of the sheets is provided by a semi-reflective coating which is one or more of an aluminum coating, a chromium coating, and a dichroic coating.

10. The illumination appliance of claim 1 wherein plurality of semi-reflective sheets individually have an outside surface including an anti-abrasion coating.

11. The illumination appliance of claim 10 wherein the anti-abrasion coating includes inorganic particles bound within an organic binder.

12. The illumination appliance of claim 11 wherein the organic binder is a ultraviolet curable binder.

13. The illumination appliance of claim 11 wherein the inorganic particles include one or more of silicon dioxide, alumina, aluminum oxide, zirconia, and zirconium oxide.

14. An illumination appliance comprising:
an illumination device including:
a plurality of interconnected hollow struts that collectively define a polygonal body with openings, the plurality of interconnected hollow struts individually have a major axis and an inward facing surface;
a plurality of semi-reflective sheets that individually close one of the openings to define an enclosure within the polygonal body;
a plurality of banks of light emitting devices (LEDs) individually mounted on one of the inward facing surfaces with the LEDs arranged along the major axis, at least some of the light emitted by the LEDs is internally reflected by the semi-reflective sheets within the enclosure and some of the light is transmitted out of the enclosure;
a controller for controlling operation of the banks of LEDs; and
a wiring system that electrically couples the controller to the LEDs, the wiring system routes through the hollow struts to individually connect to the banks of LEDs, wherein plurality of semi-reflective sheets individually have an outside surface including an anti-abrasion coating wherein the anti-abrasion coating includes inorganic particles bound within an organic binder, wherein a semi-reflective property of the sheets is provided by a semi-reflective coating which is one or more of an aluminum coating, a chromium coating, and a dichroic coating, the coating is upon the outside surface and protected by the anti-abrasion coating.

15. An illumination appliance comprising:
an illumination device including:
a plurality of interconnected hollow struts that collectively define a polygonal body with openings, the plurality of interconnected hollow struts individually have a major axis and an inward facing surface;
a plurality of semi-reflective sheets that individually close one of the openings to define an enclosure within the polygonal body;
a plurality of banks of light emitting devices (LEDs) individually mounted on one of the inward facing surfaces with the LEDs arranged along the major axis, at least some of the light emitted by the LEDs is internally reflected by the semi-reflective sheets within the enclosure and some of the light is transmitted out of the enclosure;
a controller for controlling operation of the banks of LEDs; and
a wiring system that electrically couples the controller to the LEDs, the wiring system routes through the hollow struts to individually connect to the banks of LEDs, wherein the controller is external to the polygonal body.

16. The illumination appliance of claim 1 wherein the controller is internal to the polygonal body.

17. The illumination appliance of claim 1 wherein the controller selects an operating mode from a plurality of operating modes in response to the input, the plurality of operating modes are different from each other in regards to one or more of spatial, temporal, duty cycle, and intensity of LED operation.

18. An illumination appliance comprising:

an illumination device including:

a plurality of interconnected hollow struts that collectively define a polygonal body with openings, the plurality of interconnected hollow struts individually have a major axis and an inward facing surface;

a plurality of semi-reflective sheets that individually close one of the openings to define an enclosure within the polygonal body;

a plurality of banks of light emitting devices (LEDs) individually mounted on one of the inward facing surfaces with the LEDs arranged along the major axis, at least some of the light emitted by the LEDs is internally reflected by the semi-reflective sheets within the enclosure and some of the light is transmitted out of the enclosure;

a controller for controlling operation of the banks of LEDs; and a wiring system that electrically couples the controller to the LEDs, the wiring system routes through the hollow struts to individually connect to the banks of LEDs, wherein transmissive and reflective properties of the semi-reflective sheets and the arrangement of LEDs upon the struts are configured to provide an illusion of an internal volume that is greater than an external volume of the illumination device.

19. The illumination appliance of claim 18 wherein transmissive and reflective properties of the semi-reflective sheets and the arrangement of LEDs upon the struts are configured to provide an illusion of an infinite array of crossed columns and beams.

* * * * *